June 16, 1964  F. G. LAMB  3,137,546
PROCESS AND APPARATUS FOR DEHYDRATION OF FOOD PRODUCTS
Filed Feb. 10, 1961  8 Sheets-Sheet 4

FIG. 4.

INVENTOR
Frank G. Lamb
BY Thomas, Weisman & Russell
ATTORNEYS

INVENTOR
Frank G. Lamb

June 16, 1964  F. G. LAMB  3,137,546
PROCESS AND APPARATUS FOR DEHYDRATION OF FOOD PRODUCTS
Filed Feb. 10, 1961  8 Sheets-Sheet 8

INVENTOR
Frank G. Lamb

BY Thomas, Weisman & Russell

ATTORNEYS

United States Patent Office 3,137,546
Patented June 16, 1964

3,137,546
PROCESS AND APPARATUS FOR DEHYDRATION OF FOOD PRODUCTS
Frank Gilbert Lamb, Milton-Freewater, Oreg., assignor to Lamb-Weston, Inc., Weston, Oreg., a corporation of Oregon
Filed Feb. 10, 1961, Ser. No. 88,455
16 Claims. (Cl. 34—10)

This invention relates to a rotary dehydrator and a process for the partial dehydration of food products. My previous Patent No. 2,850,809 identified and described an apparatus involving the rotary, double drum type of mechanism, wherein concentric, perforate and spaced walls are used for the containment of a charge of material to be dehydrated. Dehydration, here as with respect to the invention described in the stated patent, is obtained by subjection of the material between such double walls to dry air heated to a predetermined, elevated temperature. It is the different means and method of supplying different streams of gaseous mediums to the charge material to which the instant invention relates.

In the referred to patent, various disadvantages of previous systems devised for the dehydration or partial dehydration of food or other materials were outlined at some length, and such discussion of the prior art, and its failings in certain crucial respects, is incorporated herein by reference to the said patent.

Further experimentation with the rotary dehydrator mechanism and application of a heated gaseous medium to the double walled construction just referred to has indicated that the method of application, the mechanism for performing such method of dehydration, and the functional utility of both can be greatly enhanced by the improvements forming the instant invention.

Primarily, it has now been found that the material within the double walled structure of the rotary kiln can be more uniformly dried to the desired degree if firstly, the dehydrating medium is admitted into the interior of the inner perforate drum for passage through the product contained between the concentric walls; and secondly, that far superior performance is additionally achieved, insofar as uniformity of drying, if a supplemental air supply be utilized which is admitted into that space between the two perforate drums where no product, in bulk, is permitted to remain because of the tumbling effect there obtained through rotational movement. This latter concept is a fundamental one, in that such supplemental or classifying air supply, during the dehydration procedure, causes the loose particles such as peas, diced carrots, etc., to become air-borne. These will ordinarily be the lightest particles of the material undergoing treatment, in other words, the particles from which the most moisture has been removed. Being lighter, the classifying jet of air forces them, in airborne fashion, to the rear or discharge end of the unit. Conversely, the heavier and less dehydrated particles of the material remain more nearly adjacent the inner drum, in closer and more prolonged contact with the hot air supply, and hence are subjected to more rapid and thorough drying, until they, too, become sufficiently dehydrated for discharge to the rear of the unit. Because of this function of sorting the processed from the unprocessed material, such supplemental air is herein referred to as "classifier" air.

The two essentials just referred to which materially contribute to the involved functions and greater utility of the instant invention inherently involve other advantages: for example, air at elevated temperatures is more efficiently utilized. This is because forcing such hot air from the interior of the concentric drum applies the greatest air pressure upon the inner screen, the surface of which is considerably smaller than that of the outer rotary drum, and as the air passes through the bed of product to the outer-screen, it loses pressure but has an expanding surface to flow through. This results in the inner screen being "self-cleaned" by such air pressure. Further, substantial elimination of the "compaction" of the material on the outer screen also results. The classifier air supply also particularly contributes to this self cleaning function: entering an area relatively absent of the product, such air "jets" against the inner screen with substantial and effective force, thus removing clinging particles therefrom.

By reversing the flow of both mediums, i.e., from inside out, which is in contrast to the invention represented by the aforesaid patent, no substantial housing is needed around the unit. The practical advantages are these: the heat ordinarily lost by radiation from the housing itself before the air reaches the product, is now saved; and secondly, removal of the main portion of the housing through use of the apparatus of this invention enables the operator to observe the dehydration process as it proceeds. In addition, and even during operation, lack of housing over a substantial circumference of the unit enables cleaning of the outside rotary screen by such means as an air or steam hose, directed at the area unfilled with the product, it being understood, as stated, that the inner screen, due to the central location of air admission to the unit, is largely self cleaning.

Hence, although the basic principle of the double drum dehydrator unit is utilized in the instant invention, the considerable improvement which is here involved over my previous patent resides in this fundamental concept of admitting the main air supply to the interior of the inner drum and supplementing this main air supply, likewise through the interior of the inner drum, with an additional, classifying air supply that is jetted into that portion between the drums where, during rotation thereof, those particles reaching the desired amount of dehydration become largely air-borne or "fluidized" and consequently directed to the discharge end of the unit. These basic functions and advantages are more fully described and developed in the description which follows.

It is thus the primary object of my invention to provide a double drum dehydrator of the described type wherein the drying media, such as air at elevated temperature, is admitted axially to the interior of the inner drum for contact, by radial flow outwardly, with the material to be dried which is charged into the concentric space between the two rotary screens.

It is a further objective of the invention to provide a dehydrator of this type wherein supplementary air, that is air in addition to the main hot air supply, is likewise admitted to the center of the inner drum but selectively discharged into that concentric area between drums which is largely absent of the product, in order to sort and discharge from the dehydrator those particles which have reached a predetermined point of water removal.

Another object of the invention, and related to that last named, is the provision of means for shielding from the main dehydrating medium that area between rotary screens which is largely absent of the material to be treated, such area being subject primarily to the influence of classifying air. In this connection, an adjustable shield or seal is utilized in order that the main air supply is not vented through the opening of least resistance—that space between screens substantially unoccupied by the product charged to the unit. This sealing means, for this purpose, is adjustable to suit the requirements of different products to be dehydrated, and is also useful in blanking off a substantial area while the dehydrator is being either initially filled or completely emptied.

A further object of the invention is to provide a method and means for rendering the particles of product having the least moisture content air-borne, and this is accomplished by the supplementary air supply hereinabove referred to. Such air supply is of a pressure and velocity, and directed in a direction, to "fluidize" the bed of material which is tumbling at the upper portion of the concentric drums during the rotation thereof. As stated, this permits discharge of those portions of the product which have been sufficiently dried, and assures retention within the concentric screens of those portions of the material which have not reached a sufficient amount of dehydration, so that this latter amount of the material is further subjected to the main dry air supply until the state of drying is reached where this portion in turn becomes air-borne and is discharged to the rear. In this respect also, the invention provides for a method and means by which the desired amount of dehydration, be it 40% or 60%, or any predetermined amount, is uniformly attained. By such mechanism, if temperature, rate of flow of dehydrating medium and other conditions are properly set for dehydration, say to 50%, it will be found that most particles of the product are dehydrated to that extent, and not substantially more nor less than that extent.

Another object of the invention is the provision of means permitting variation in the direction of feed of such classifying air into the annular chamber between screens containing the product, such enabling full control over the fluidizing of the bed of material, irrespective of the type of food product being dehydrated.

A further object of the invention is the provision of a double drum apparatus wherein the exterior or outermost of the two perforate and product containing drums is made with sectional screens, the several sections of which can either be pivoted outwardly for cleaning and access to the inner screen, or completely removed for the same purpose.

An additional object of the invention is the provision of a unique seal construction at each end of the annular chamber formed by the two concentric reels, such seals effectively restricting flow of dehydrating medium out of each end of the unit and confining the flow of such medium to that annular space occupied by the bulk of the product; in this respect both ends of the concentric and revolving drum arrangement abut against such seals which are stationary and merely in frictional engagement with respect to the rotary units.

Other advantages and objectives of the instant mechanism and the method of dehydration herein disclosed will be evident from a consideration of the following more detailed description thereof, having reference to drawings illustrating a preferred embodiment of the invention, and wherein.

*General Description of Invention*

Figure 1:
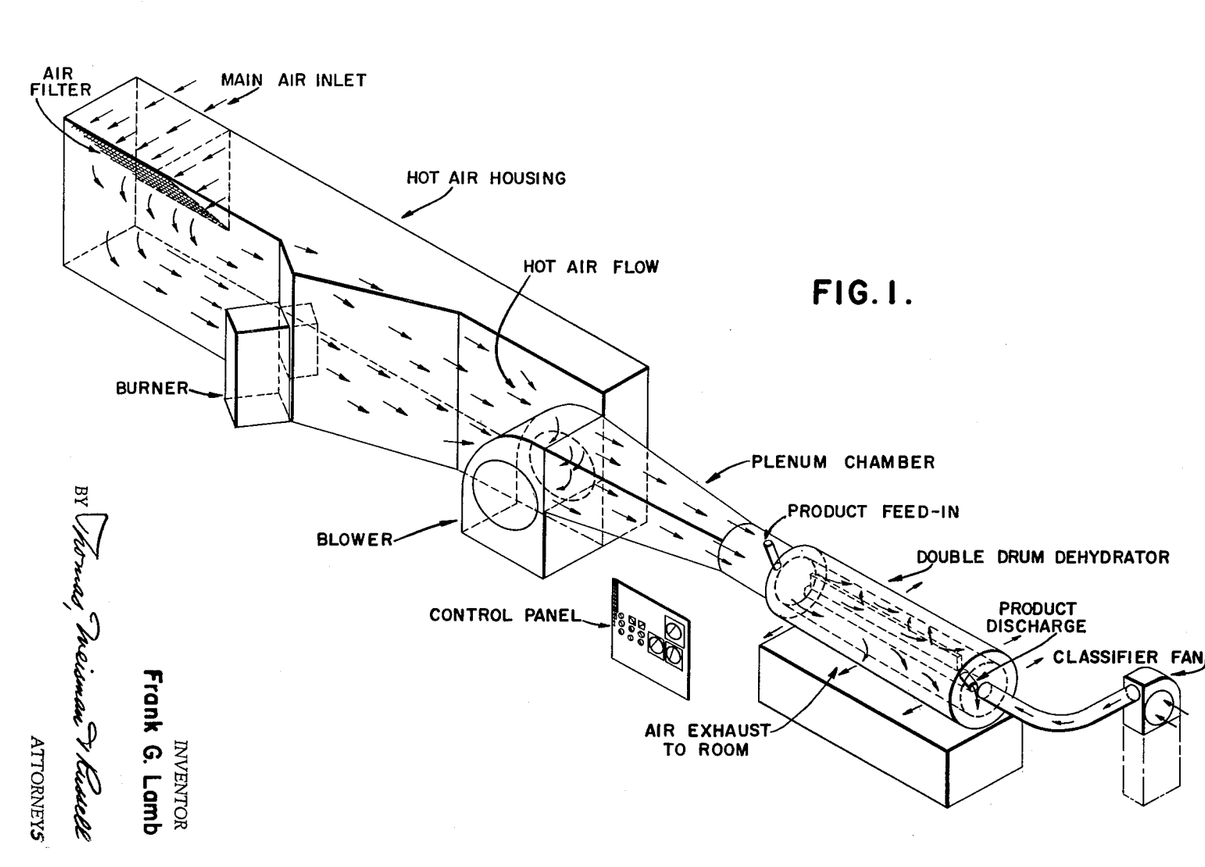
FIGURE 1 is a schematic, perspective and phantom view of the over-all fundamental combination of the invention, and explanatory of the basic elements thereof.

The general arrangement of the several elements involved in the novel assembly of this invention, and with particular emphasis on the manner of supplying dehydrating medium, is graphically illustrated in FIGURE 1— a more or less diagrammatic showing of the correlation and relationship of such elements.

Thus referring to this figure, it is seen that a main air supply, perhaps drawn from a point exterior to the building in which the unit is operated, enters into a relatively large housing after first being cleaned by an appropriate air filter.

An angularly mounted burner heats the incoming air to the desired degree, the same being forced through the housing by a suitable blower, as indicated. The burner is preferably of the open flame type, such flames feeding directly into the hot air housing. It may be preferable to control actuation of such burner or degree of flame output thereof automatically, as by the use of thermocouples, thermostats or related equipment, which when set to the degree of heat desired will cause the burner to function in accordance therewith and maintain the desired temperature at a constant rate. In such event, temperature responsive mechanisms can be located in the plenum chamber.

After heating the incoming main air supply to the desired extent, such is forced by the indicated blower through the referred to plenum chamber, the latter in this instance being narrower at its output end to thereby increase the velocity of the dehydrating medium to the double drum dehydrator.

As indicated in FIGURE 1, the product to be dehydrated is fed into the forward end of the double drum dehydrator and in between the two concentric, perforate screens. This latter annular area, except for inlet and discharge openings, is sealed at each end so that the dehydrating air, at elevated temperature and entering into the center of the inner reel, is forced through the product in such annular area. Such dehydrating medium is thus dissipated by passage through the product which occupies a substantial portion of this space between the two perforate drums, as will be later described. Such air is then, in large part, vented through the outer screen or reel to the room.

At the same time as dehydration is taken place through use of the main dehydrating medium, what I prefer to term as "classifier air" is also admitted to the center of the drum, but in a direction reverse to that of the incoming main air supply. Such classifying air may be at room temperature, since its function is not principally one of drying, but same is admitted at higher pressure than that of the main dehydration medium. On the other hand, the classifier air may be preheated in any known fashion if conditions, such as type of product being processed, so require.

In the preferred embodiment of the invention, the blower for the main hot air supply should be of a type capable of up to about 100,000 c.f.m. against a head pressure of about 4 inches. Such blower is also preferably arranged to be driven at variable speeds so that less c.f.m. and less head pressure can be delivered if required. The blower is designed to operate continuously on air up to 250° F. Also, this blower may be automatically controlled as by the use of suitable anemometers or equivalent devices positioned in the air stream in the plenum chamber and responsive to variations in velocity or pressure of air delivered to that chamber.

As stated, the classifying or supplemental air is delivered in less volume but at greater pressure or velocity. It is preferred that the classifier blower be capable of delivering up to about 6,000 c.f.m. against a head pressure of up to about 6 inches. Also preferably, the classifier blower, as well as the main blower, should be arranged for output at variable speeds so that such maximum fan capacities can be adjusted as required.

A more exact relationship between the main air supply and its related functions, and the functions and results attained through the use of a secondary air supply, will be set forth in more detail hereinafter.

At any rate, as indicated in FIGURE 1, a suitable control panel is utilized to balance the variations involved in proper operation of the dehydrator mechanism of this invention, such variables involving factors, inter alia, as burner heat output, velocity and force of main air supply, velocity and force of supplementary, classifying air supply, rate of rotation of the double drum structure, and rate of product feed-in. As to this latter factor, automatic devices can also be employed to vary the rate of feed to balance with amount of air, heat supplied, etc. A regulator of the Eberts type, or any other adequate metering device known to the art, can be installed in association with the product feed-in line to maintain such feed at a predetermined, uniform and constant rate.

From this prefatory description of the invention, a general understanding of the operation thereof may be grasped: the product is fed in between two rotary screens which are concentric, spaced from each other, and sealed at both ends. As herein described these are somewhat similar to the perforate, double drum construction described in my aforesaid Patent No. 2,850,809. The product may consist of peas, diced carrots, diced potatoes or any other food produce susceptible of substantial dehydration and subsequent reconstitution, should only partial dehydration be desired. These drums are rotated in unison by suitable mechanism at speeds of from about 3 r.p.m. to 5 r.p.m. depending upon the particular characteristic of the product being processed. During such rotation air at elevated temperatures enters into the open tubular area within the inner drum. In operation, the material being processed fills that annular area between rotary screens which comprises an arc of about 280 degrees to 300 degrees, so that there is an upper, open annular space of about 60 degrees to 90 degrees substantially absent of such material. To prevent venting through this open space of the primary dehydration media entering the inner chamber inside the inner screen, this open area is blocked off or sealed by suitable mechanism, to be described in more detail.

The dehydration media, thus being blocked from a space where it would ordinarily be vented without passage through the product, is consequently forced through the inner screen, through the product and thence through the outer screen, the major portion thereof being exhausted to the room, as indicated in FIGURE 1.

At the same time a classifier blower delivers classifying air in an opposite direction into the central portion of the dehydrator. Such classifier air, delivered at greater pressure than the main heated air supply but not necessarily in greater volume, is caused to flow, by a suitable passageway along the longitudinal axis of the unit, and by a further radial passageway right angular thereto, into that area which has been blocked off by the sealing device referred to. Constant rotation of the two screens causes the product to tumble from one side toward the other of the unit in the direction of rotation and within the 60 degree area referred to above. While being rotated and tumbled within the annular area between reels the product or particles of product lose a substantial amount of water and this, decreasing the weight thereof, causes the lighter particles (e.g., peas which have reached proper amount of partial dehydration) to become air-borne by the secondary stream of air which "jets" into this area of "tumbling." Hence, the product in the annular 60 degree to 80 degree area which becomes dehydrated first, and is therefore lighter, is carried by the force of the supplemental air supply to the discharge opening. Heavier particles of the product not losing as much water as those sufficiently dehydrated, do not become air-borne so long by the supplemental air supply and resultantly remain closer to the inner area of the inner screen, thus contacting more of the hot air of the main air supply until they also progressively become dehydrated to that extent necessary for fluidizing and ultimate discharge.

The result is a product uniformly and continuously dehydrated to a definite and predetermined extent. In other words, the entire mass of the product is subjected to uniform water reduction without some of such mass exceeding the amount of dehydration desired and another part of the mass not reaching that point of dehydration which is required or necessary.

The method and apparatus of this invention thus provides for a continuous, controlled and metered flow of product through the dehydration unit, all of the involved variables readily lending themselves to automation so that once the degree of water removal is decided upon such variables as are involved can be easily coordinated and regulated to reach and maintain that degree.

*Base Support and Drive Means*

Figure 2:
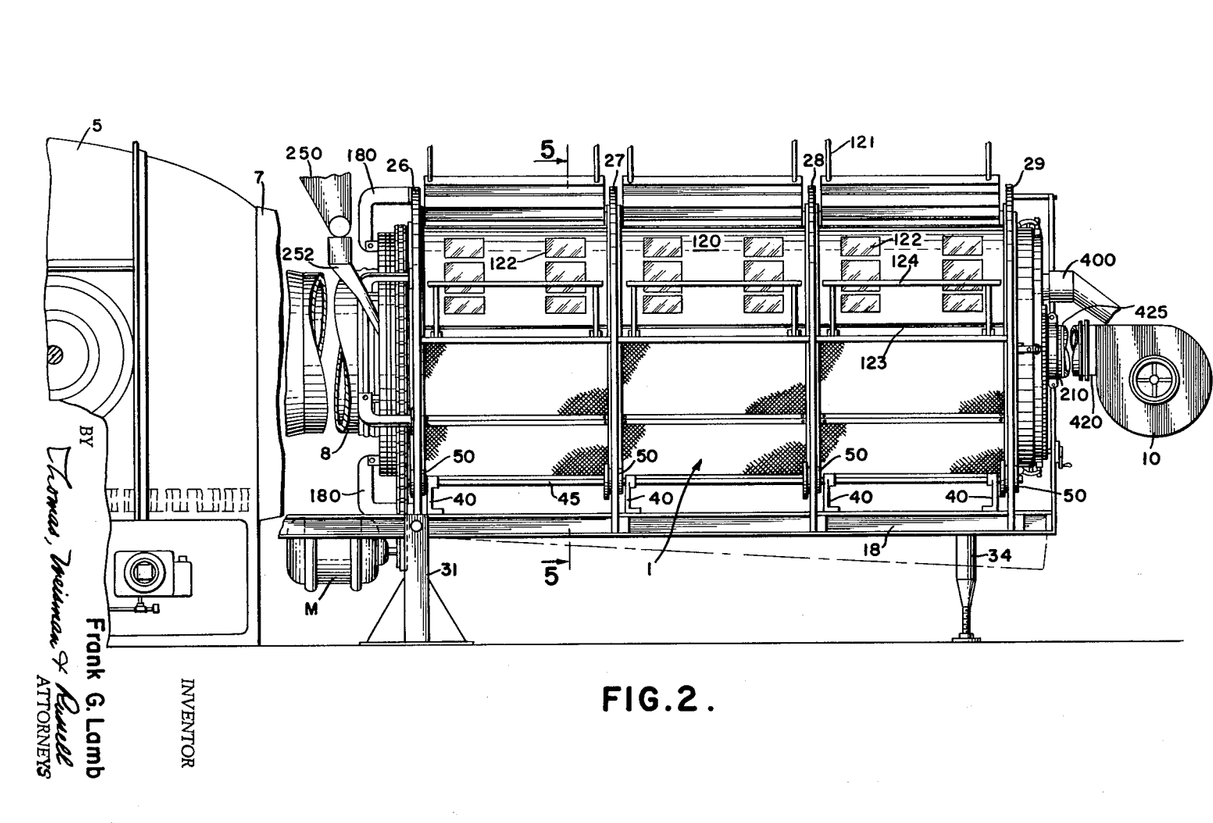
FIGURE 2 is a side elevation view of the invention illustrating particularly the axial inlet for the main dehydrating medium, the central and coaxial inlet for the classifying air supply and the relative amount of coverage afforded by the partial housing.
Figure 3:
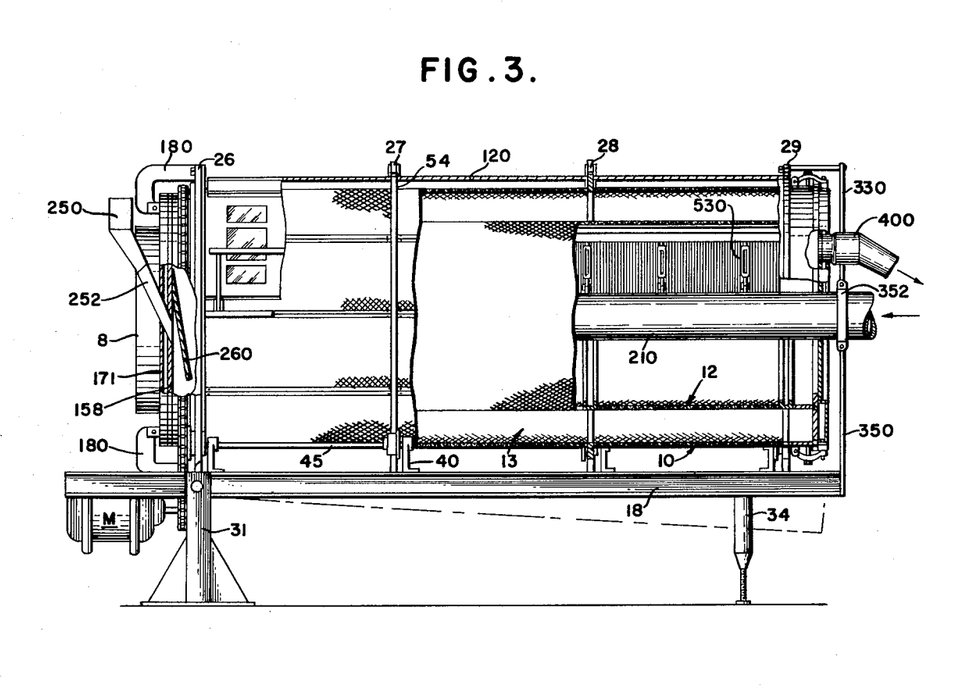
FIGURE 3 is a view similar to FIGURE 2 but partially in section, further showing the relative proportioning of the inner and outer rotary screens, coaxial relationship between main and classifying air supply, and also illustrating the relative positioning of the product inlet and discharge means.

Referring particularly to FIGURES 2 and 3, it is seen that the essential elements of the rotary, double drum unit, generally indicated at 1, consist of an outer rotary screen 10 which surrounds an inner screen 12 in concentric fashion, leaving an annular area generally designated at 13 therebetween, this area accommodating the product to be processed. Air at elevated temperature, after leaving the plenum chamber 5, is directed through a tapering conduit 7 to inlet line 8, which feeds directly into the space circumscribed by the inner reel 12.

The main frame for support for the rotatable drums or screens 10 and 12 consists of two spaced and parallel I-beams or channel irons 18 and 20 respectively. These are separated by two end elements or spreaders, 22 at the front and 24 at the rear of the unit. Such longitudinal channel irons may be extended forwardly a sufficient amount to afford support for the motor M, the latter being of a type permitting variation in r.p.m. so that speed of rotation of the double drum can be controlled. At the forward end of the unit, two upright stanchions 30 and 31 provide support for the frame members just mentioned, and such frame members are pivoted in these stanchions as indicated by the pivots 32 and 33 respectively. The rear of the unit is supported upon jacks 34 and 35.

Pivoting of the frame permits tilting thereof downwardly toward the rear at an angle to the horizontal. Such tilting aids in accelerating output in proportion to the degree of tilt, for the product being dehydrated will naturally tend to progress by gravity towards the discharge outlet during operation. Other factors also enter into rate of flow of product through the unit, as rate of feed, rate of discharge, input of classifying air, all of which can be controlled. At any rate, the amount of such angular inclination, indicated in dotted line in FIGURES 2 and 3, may be varied by the two screw jacks 34 and 35, respectively, at the rear of the unit. By adjustment of the usual screws 38, the rear of the rotary mechanism may be maintained at the horizontal or adjusted to the desired angular inclination.

At both front and rear, the stanchions and jacks, as the case may be, can be further supported by cross bars 25 or similar strengthening elements.

A series of metal strips forming braces encircle the double drum unit, the respective extremities of same being welded to the frame members 18 and 20. Thus, circular braces 26, 27, 28 and 29 (see FIGURE 2), of metal of suitable thickness are spaced a slight distance from the ring or track members, to be described, upon which the double drum unit rides in a series of suitable trunnions. The braces just identified which encircle the unit not only lend rigidity to the main frame, but also provide support, as will be seen, for such additional elements as the partial hood surmounting the top of the unit and apparatus related to the two end seals, the latter preventing discharge of the dehydrating medium at either end of the annular product receiving chamber 13.

The double screen unit is of course supported for free rotation and to this end the respective channel irons 18 and 20 are each fitted with a series of bearings or journals 40. The latter are secured to the main frame members. On one side, the trunnion shaft 45 is mounted through such journals, and on the other side a similar trunnion shaft 46 is similarly mounted. These two shafts support a series of trunnions, the shaft 45 supporting trunnion wheels 50 and the shaft 46 accommodating trunnions 52. In the present instance, there are four such trunnions upon each side of the rotary drum unit. With reference to the outer screen 10 and in this embodiment of the invention, it will be seen that such screen (as well as the inner screen) is made in three sections. Accordingly, at those intermediate spaced points where such sections come together, a circular track is mounted for engagement with the trunnions just described. Such intermediate circular tracks are indicated at 54 and 55. Also, similar tracks are positioned at each end of the rotary unit as shown at 53 and 56 (see FIGURE 7). Hence, the double drum unit is supported at four equally spaced points. These tracks or trunnion engaging rings 53 to 56 inclusive, are adapted to ride upon and engage the appropriate trunnion wheels as best illustrated in FIGURE 3. Such trunnions as 50 and 52 are either mounted for free rotation upon the respective shafts 45 and 46 or if secured to such shafts, the latter are arranged to freely rotate within the several respective journals 40. Thus, the double drum unit, so supported by the several drum rings 53–56, is mounted for free rotation in either direction upon such trunnions.

Figure 7:
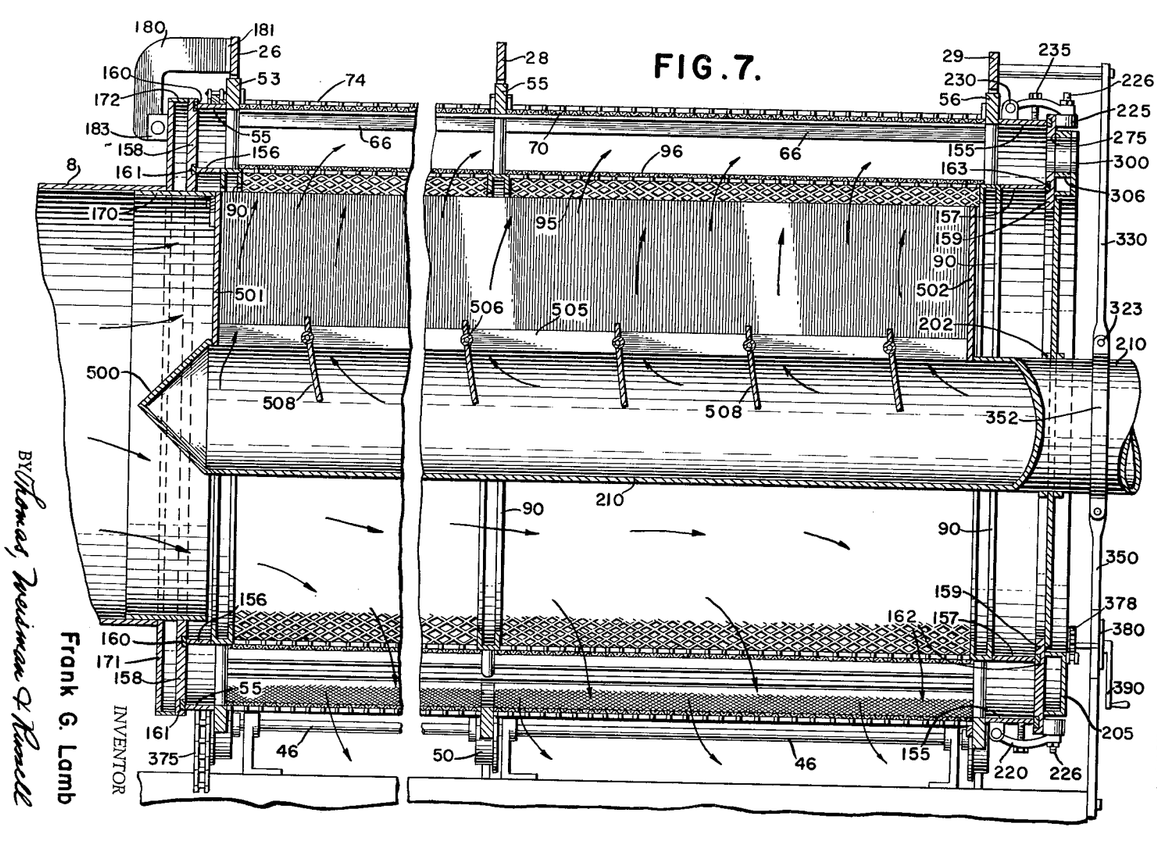
FIGURE 7 is a section view taken on the line 7—7 of FIGURE 5.

The drive means for the double drum unit takes the form of a ring gear 57 (FIGURE 4) which is secured to a tubular element 55 forming one end of the outer screen 10 and lying adjacent to the drum ring 53 (FIGURE 7). The ring gear 57 may be welded or otherwise securely affixed to such element 55 so that movement thereof will result in corresponding rotational movement of the two dehydrator screens. As will appear by reference to FIGURE 4, a suitable chain drive 60, which engages the referred to ring gear 56, is driven by the motor M. The inner and outer concentric screens of the dehydrator, being secured together in a manner to be described, rotate in unison as dehydration progresses.

The motor M is of a variable speed type, or fitted with a variable speed transmission, so that the r.p.m. of the double drum unit can be varied and adjusted to the proper speed, as dictated by operative conditions, as type of product being processed, rate of flow of dehydrating and classifying mediums, drying temperature, etc.

The Rotary Double Drum Construction

The two rotary outer and inner screens generally indicated at 10 and 11 respectively, are spaced apart, in the preferred embodiment of this invention, approximately 6 inches. This spacing is suitable for an arrangement where the over-all length of the unit is approximately 16 feet and the diameter of the outer drum is about 6 feet. As stated, the two perforate drums are concentrically mounted with the referred to 6 inch spacing therebetween representing an annular chamber, generally indicated at 13, such chamber receiving the charge of material to be dehydrated.

Figure 8:
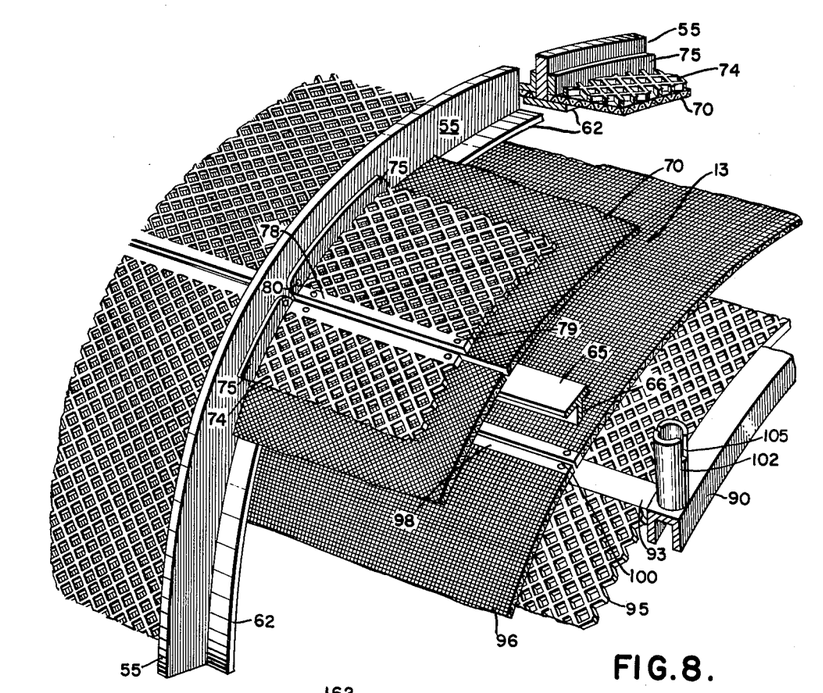
FIGURE 8 is an enlarged perspective view, partially in section, showing a portion of the two rotary screen elements, manner of fabrication and relative positioning thereof.

The construction of the two perforate drums or screens is particularly illustrated in FIGURE 8 which for purposes of explanation may be considered a perspective view involving an intermediate circular track such as track 55. Such track 55 is actually of a T-configuration, the lower right angular flange 62 forming the T-joint. Elements 55 and 62 may be fashioned integrally or, as shown in FIGURE 8, separately made and secured together in any suitable manner, as by welding. As heretofore stated, the circular track 55 is one of four such elements and the outer rotary screening members fit within each of such tracks (53, 54, 55 and 56), in a manner now to be described.

The circular ring formations just referred to are spaced from each other by a series of longitudinal T-bars which are also evenly spaced from each other and represented by the T-bar 65, each of such T-bars having a lower depending flange 66. The elements 66 may be considered as product lifters during rotation, for, extending into the annular chamber 13, they contact, lift and propel particles in contact therewith in the direction of rotation of the reels. Rigidity is lent to the outer screen by the circular rings 53 to 56 inclusive which are mounted in parallel fashion with respect to each other, and the longitudinal evenly spaced T-bars 65 which are affixed to such circular rings by welding, bolting or other suitable media.

In any event, it is important to note that the outer screen of the double drum unit is made up of a number of removable segments in order that the latter can be readily cleaned and also access had, after such removal, to the inner screen for cleaning purposes. Thus, each segment of the outer screen is positioned within the area defined by two adjacent tracks, such as tracks 55 and 56 on the one hand, and two adjacent T-bars 65 on the other. A portion of such a removable segment of the outer screen is illustrated in FIGURE 8.

Both inner and outer perforate drum assembly include a screen of relatively fine mesh facing towards the annular chamber 13 and an outer screen or supporting element of preferably expanded metal. With respect to the outer perforate drum, the inner screen, preferably of about 10 mesh, is represented at 70. This rests directly upon the flanges 62 of two adjacent ring members such as 55 and 56, and with respect to the opposite sides of such a segment the screen member 70 rests upon approximately a half portion of the opposed T-bars 65. The finer mesh screen 70 is disposed on the side facing the annular chamber 13 and is backed up by the expanded metal framework 74, just referred to. Both screens 70 and 74 are secured together at their respective edges in any usual manner and also secured at such edges on two of the opposed sides by the upstanding elements 75, the latter matching the circular configuration of the circular tracks. Upon their longitudinal edges the screens 70 and 74 interfit with additional frame members 78. These frame members 78 may be bolted to the involved T-bar 65 by bolts or rivets 79 in such fashion as to clamp inner and outer screens to the said T-bars. The curved, upstanding elements 75 are removably affixed to the curved track members such as by pins 80, which also may be used as pivots or hinges upon which each segment may be individually pivoted or rotated. In other words, each segment of the outer screen, containing both the inner fine mesh 70 and the outer expanded framework 74 is made removable with respect to the framework represented by ring elements 55 and T-bars 65. If it be desired not to completely remove such a segment for cleaning purposes or otherwise, that segment, by removal of one of the pivot pins 80 on each side thereof, can be opened by pivoting the same upwardly upon the other pair of pivot pins 80 in the fashion indicated in dotted line in FIGURE 5. Thus, the operator, with respect to the outer concentric screens, may optionally pivot certain sections to an open position or, by removal of all pivot pins, can completely remove any or all of such segments for cleaning or replacement, and for inspection and cleaning of the inner of the drum elements.

The inner screen unit of the twin drum construction is likewise fabricated of a series of traverse ring or annular members 90, here shown as U-elements with the face thereof disposed upwardly (see FIGURE 8). These ring elements 90, in this embodiment of the invention, are four in number to match the outer ring elements 55, and are disposed immediately underneath the outer members such as 55 and in parallel and aligned relationship therewith. The main supporting framework of the inner screen consisting of such elements 90 comprises also longitudinal separating elements 93, here shown as merely flat metal strips which are welded or otherwise suitably affixed to the adjacent of such ring elements 90. The bars 93 are likewise juxtaposed immediately underneath the T-bars 65 and in parallel and matching relationship therewith.

The inner screen, consisting of an inner expanded metal support 95 and a surmounting finer mesh screen 96, is fabricated with the latter disposed toward the annular chamber 13, such chamber thus being bounded on its outer and inner sides by relatively fine screening of the same mesh.

The expanded metal portion 95 of the inner screen is cut to fit the rectangular and circular configuration of segments of the inner screen defined by the longitudinal elements 93 and the circular and spaced supporting members 90, and such expanded metal segments are then welded or otherwise suitably affixed to these respective elements in any known fashion. The inner finer mesh screening of the inner drum unit is also fabricated to match the boundaries defined by longitudinal members 93 and circular elements 90. It may be fabricated with edges 98 on each side representing a binding for the inner screen, and the latter secured to the boundary elements which have just been described by such usual means as a series of screws or bolts 100.

It will be noted that the drive and supporting rails 53, 54, 55 and 56 divide the longitudinal area of the dehydrator into three sections. Each of such sections, and with respect to both drums, contains six 60 degree segments of screens. Hence both outer and inner drums each contain 18 screens secured together in the manner just described, and with the outer screen segments being pivotally and removably mounted for the purposes herein set forth.

The double drum construction just described represents a unit wherein the two concentric perforate elements 10 and 12 are commonly driven to rotate together and are rigidly secured together for such simultaneous rotation.

Complete support for the inner perforate, rotating unit is found in its attachment to the outer drum. Such attachment takes the form of a series of radially spaced and tubular spreaders 102 which are preferably placed at the intersections of the ring elements 90 and longitudinal bars 93 of the inner drum; as well as at the intersections of the ring elements such as 55 with the T-bar 65 of the outer drum. Referring to FIGURE 8, it is seen that each of these spreaders 102 is provided with a suitable slot 105, which slot matches the depending flanges 66 of the T-bar of the outer screen. The spreaders 102 are welded to the ring elements 90 and then at the opposite ends thereof welded or otherwise affixed to the flanges 66 after the latter have been disposed in the referred to slots 105.

In the embodiment herein shown, the inner unit 12 of the double drum construction is not adaptable for ready removal in sections as is true with respect to the screen elements of the outer drum, cleaning being readily accomplished by merely removal of the removable segments of the outer drum, it being understod however that the several segments of the inner drum can be fabricated in the described fashion as to also permit individual separation from the inner drum supporting structure.

At any rate, by the arrangement just described, it will be clear that the inner perforate drum is rigidly mounted from the outer screened construction 10, spaced concentrically with respect thereto and suited for unitary motion with the other drum, the approximately 6 inch spacing between drum units representing the annular chamber 13 to which material to be dehydrated is admitted.

It has been stated that with the different system here employed, i.e., admission of the dehydrating and classifying mediums to the interior of the double drum unit for passage outwardly through the annular product receiving chamber, a complete enclosure or housing for the unit, as has been described in my aforesaid Patent 2,850,809, is unnecessary. Viewing FIGURE 5, it is seen that during operation of the invention wherein the annular chamber 13 has been filled with the product to the extent there indicated, there will be a portion of that chamber substantially absent of such product, this portion being generally indicated at A in that figure. It is here that a "tumbling" effect takes place, due to reel rotation, and it is here also that the classifying medium is admitted to render air-borne the loose and dehydrated particles of product for ultimate discharge.

Figure 5:
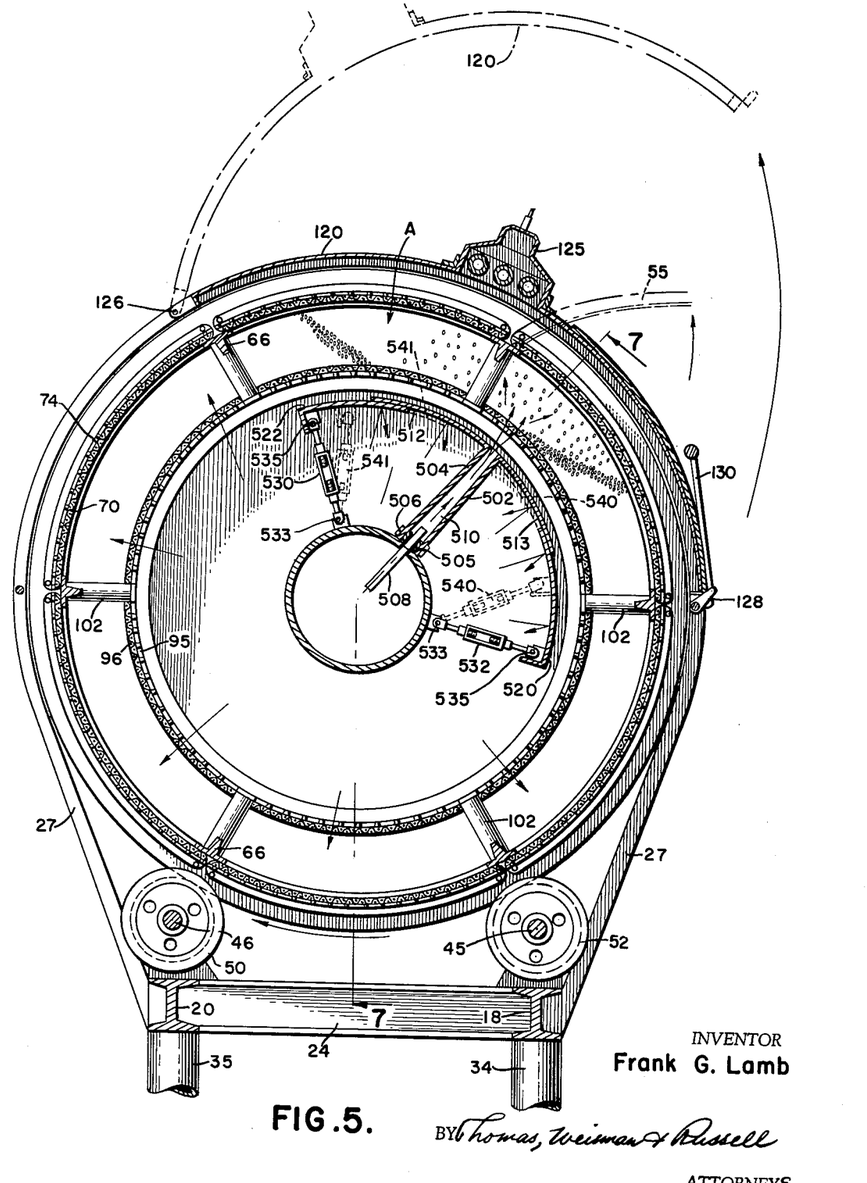
FIGURE 5 is a section view taken on the line 5—5 of FIGURE 2.

In any event, and in the processing of peas, the area A occupies a radial space or arc of some 80 degrees, although with different products such area may in operation vary from an angular area of about 60 degrees to 90 degrees. Since there is not enough product in this area to afford an air block it will appear that admission of dehydrating and classifying air at elevated temperatures into the interior of the unit without some sealing means for that area, would ordinarily result in such air being dissipated through the path of least resistance—that 80 degree portion just mentioned substantially free of product and hence offering an open exit for discharge through the rear discharge opening.

Accordingly, as one such means to preclude escape of particularly classifying medium through the stated space, a partial covering for the unit is essential throughout that radial space or arc which substantially covers the open area A of the annular chamber. The cover 120 as most clearly shown in FIGURE 5 is disposed not only over area A but somewhat exceeds that area, substantially overlapping the area occupied by the product being dehydrated. In this embodiment of the invention such hood 120 is designed to cover an arc of approximately 120 degrees extending from approximately the 11 o'clock to 3 o'clock position, as viewed in this figure. This hood is segmented into three parts as shown by reference to FIGURE 2, the first section being disposed between the encircling frames 26 and 27, the intermediate section positioned between frame members 27 and 28 and the opposite end section being located between frame members 28 and 29. Such sections of the cover are located reasonably close to these frame members and hence each section is positioned directly over corresponding sections or segments of the screens of the doubled rum unit.

Considering the volume of classifying air supplied to the unit and proximity of the hood segments to the screen elements, loss of air through area A is thus rendered negligible and certainly insignificant for proper operation of the mechanism. The hood, in thus preventing discharge of the supplemental air directly and radially through area A and the outer screen 10, forces such air to take a longitudinal path toward the discharge point at the rear of the unit. Such rearward flow of air renders air-borne those particles which have become sufficiently dehydrated, carrying them toward the discharge outlet.

In order to facilitate constant observation of the dehydration procedure as it progresses, each segment of the cover is provided with suitable windows 122 which enable the operator to examine the state of the product and particularly the effect of the classifying air supply in rendering the partially dehydrated material air-borne. Such observations are further facilitated by elongated illuminating devices 125 here shown as fitted with triple fluorescent units.

The cover can be pivoted upwardly as indicated in FIGURE 5 by means of a suitable pivot mechanism 126, the latter engaging the rear of the cover and the respective ring elements (26, 27, 28 and 29), whichever ones may be involved. The cover may thus be pivoted upwardly to the position shown in dotted line in this figure, and when returned to operating position is locked in the latter position by a suitable hasp or equivalent structure 128 fitted with an operating handle 130 for manual use. Hooks 121 or equivalent means are secured to the several sections of the hood so that the same can be raised or lowered by suitable mechanism in the manner described. A catwalk 123 having guard rail 124 is provided for use by the operator.

The partial hood just described is provided primarily to prevent the escape through both screens of classifying air without proper contact with the product. A further shielding means, adjustable in nature, is utilized to prevent discharge of the primary dehydrating medium through this same open area. This additional shield is employed in conjunction with the radial classifier air passageway and will be described hereinafter with respect to the mechanism for admission of such supplementary air supply.

*End Sealing Means and Product Feed and Discharge*

It is necessary that the annular chamber 13 be sealed at each end around the periphery thereof except at the point of feed-in of the product to be dehydrated and excluding also that point at the opposite end of the unit where the product, after dehydration, is continually discharged.

To this end, two sliding seals are provided at the respective ends of the dehydrator, such sliding seals closing the end portion of the annular space 13 except for the points mentioned.

It has been noted that the outer rotary screen of the dehydrator terminates at the inby end in a collar 55 to which reference has heretofore been made as furnishing the support for the ring gear 57 which drives the unit. A like tubular collar 155 is provided at the opposite end of the outer perforate screen member.

Similarly, the inner and smaller screen 12 terminates in an annular collar 156 of tubular formation at the inby end and a like ring formation 157 at the discharge end of the unit. The inner collars 156 and 157 are coaxial with and welded to the respective U-shaped ring element 90 which they abut.

These tubular end formations of both outer and inner dehydrator drums are adapted to contact in sealing relationship an appropriate stationary seal, or at least be in such contacting or near contacting relationship with the respective sliding seals as to preclude any substantial escape of dehydration and classifying air through the end areas of the annular space 13.

Confining the description first to the inby end of the dehydrator, it is seen that the sliding seals are mounted in an annular end plate 158. This end plate has imbedded in it two circular seals 160 and 161, such being located as to be directly opposite the collars 55 and 155 and in contacting relationship therewith. It is obvious that circular grooves are cut in such plate 158 to accommodate these end seals. The latter are preferably made of such a substance as Teflon, a known commercial product, and typical of other tetrafluoroethylene derivatives having like characteristics of hardness, durability and resistance to frictional wear. The seals 160 and 161 as well as the end plate 158 are mounted in stationary relationship with respect to the inner and outer rotary screens. It is obvious that seal 160 is adapted to contact tubular element 55, and seal 161 arranged to contact element 156.

Means for maintaining the plate 158 in the position shown in FIGURE 7 is found in the companion plate 171 which is secured to that just described by a connecting member 172. Also, both plates 158 and 171 may be welded to the inlet tube 8 for the main air supply and in addition welded to an inner tubular frame 170.

In addition, these contacting seals are maintained in stationary relationship with respect to the rotating double drum unit, and additionally supported by brackets 180 that are welded or bolted to plate 181, the latter being affixed to the ring or hoop formation 26, previously described. These brackets, six of which are shown (FIGURE 4) are angular in formation and extend downwardly and right angularly to a position in front of the outer plate 171. Five are secured by bolt 185 to a lug 183 which is affixed to such outer plate 171. The lowermost of such brackets is welded to the frame member 22.

Thus upon rotation of the twin drum unit, the respective ends of the tubular members 55 and 156 bear against, in sealed relationship, their corresponding circular Teflon seals 160 and 161.

The opposite or discharge end of the unit is provided with a similar and corresponding set of circular seals. In this instance, the tubular elements 155 and 157 of the respective outer and inner rotary drum are adapted to contact suitable seals in the end plate 159. These seals, 162 and 163, are of the same configuration, mounted upon the inner face of the plate 159 and positioned to rest in slidable relationship with the two collars 155 and 157.

The end plate 159 and hence the two concentric Teflon seals are also positioned in stationary relationship with respect to the rotating drums, being welded or otherwise suitably affixed, as by bolts 190, to an end plate 200. The latter in turn is provided with a bushing or bearing 202 positioned in close but slidable relationship with the supplementary or classifying air supply tube 210 which enters the unit at this discharge end. The tube 210 thus supports the seal arrangement at this end of the dehydrator.

The plate 159 supporting the sliding seals at this outby end of the dehydrator is reinforced by a channel 205 positioned as to leave a trackway adjacent the outer periphery of the plate 159, such channel being operatively associated with the means for locating the discharge opening, as will be described.

It is obvious that means must be provided at this end of the unit for assuring that both sets of seals at each end are in reasonably tight relationship with the respective collars of the twin units and accordingly, at the outby end of the unit a series of equally spaced spring brackets 220, six in number, are provided. These brackets support rollers 225 mounted upon suitable bearing or shaft members 226, such rollers being thus arranged to ride in the peripheral trackway, just referred to, of the plate 159.

The brackets 220 are each pivoted to an equivalent number of spaced lugs 230, and the latter welded to the outer tube 155. The brackets 220, as stated, are of spring steel and take the curve formation as shown in FIGURE 7. A bolt 235 is threaded through the center portion of each of such brackets and the tubular element 155. Such bolts are used to vary the amount of tension placed upon the several rollers 225. In other words, if the bolt 235 is turned to compress the bracket, there is corresponding outward movement of each of the rollers, whereas if the bolt 235 is retracted, the full amount of stress may be placed upon the rollers and hence the end plate 159, assuring that such end plate and hence the corresponding seals 162 and 163 bear against the two tubular collars 155 and 157 with sufficient pressure to effectuate a relatively tight, but not restrictive, seal. It is also to be appreciated that the stress placed upon the end plate 159 by the springs 220, exerts corresponding stress upon the opposite end of the unit, assuring proper contact of the end seals at the forward end with the elements 55 and 156.

It is thus seen that by the sealing means at each end which has just been described, the annular passage 13 is blocked at each end except for, as stated, appropriate inlet and discharge openings.

Accordingly, the main supply of dehydrating media enters the feed-in tube 8 which directs same into the axial space within the inner drum. Since such primary air is prevented from venting through the open area A, by shielding means to be described, and since the annular passageway 13 is sealed at each end of the unit as just set forth, such air is necessarily forced through the inner screen through the product in the annular rotating chamber 13 and thence outwardly into the room.

Figure 4:
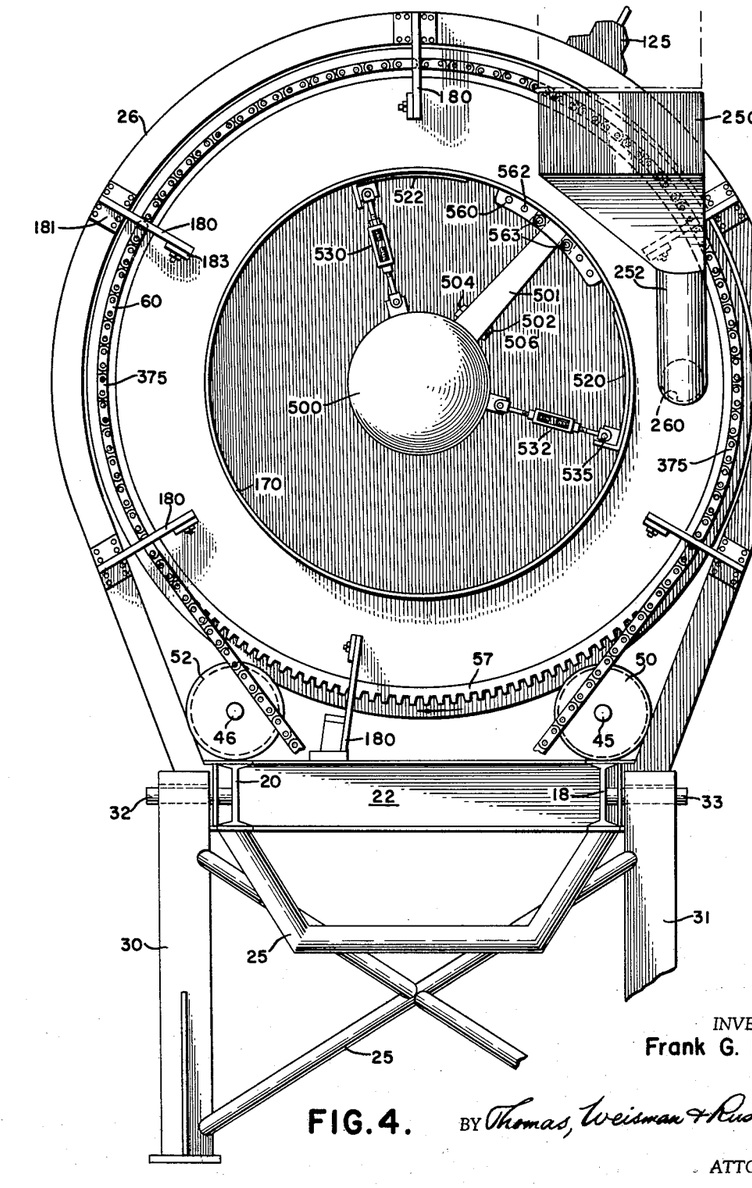
FIGURE 4 is a front end and elevation view of the invention, somewhat enlarged, and illustrating the relative locations of the main air inlet, supplementary air inlet, support for the latter and product inlet.

With particular reference to FIGURES 2, 3 and 4, the manner of feeding-in the raw product will now be described. It is seen a hopper 250 is located immediately above the inlet to the dehydrator unit. Controlled feed, as explained before, may be obtained by automatic devices which regulate the amount which is continuously fed to the dehydrator during continuous operation thereof. In any event, the hopper 250 empties into a chute provided with a downwardly inclined discharge tube 252, the latter being connected to the front walls 158 and 171 and penetrating such walls through appropriate apertures therein. Observing FIGURE 4 it will be seen that the feed-in opening through such walls, here shown at 260, is located in a position 90 degrees from the vertical or upon the right side of the unit, viewing this figure. Such inlet is centered to open directly into the annular space 13 between the concentric screen formations. In order that feed-in of the material to be dehydrated is not interfered with by descending particles of the product, assuming the dehydrator to be filled to the required level, the feed-in inlet 260 is protected by a sloping baffle 260 affixed to the inner wall 158 and projecting over the inlet opening, as particularly shown in FIGURE 3. During operation when particles of the product are rotating between the two screens, and hence such particles are thrown in circular fashion around the screens by the product lifters 66 in the annular passageway 13, such baffle will prevent jamming of or interference with the proper supply of product as same is emitted from the opening 260.

Figure 6:
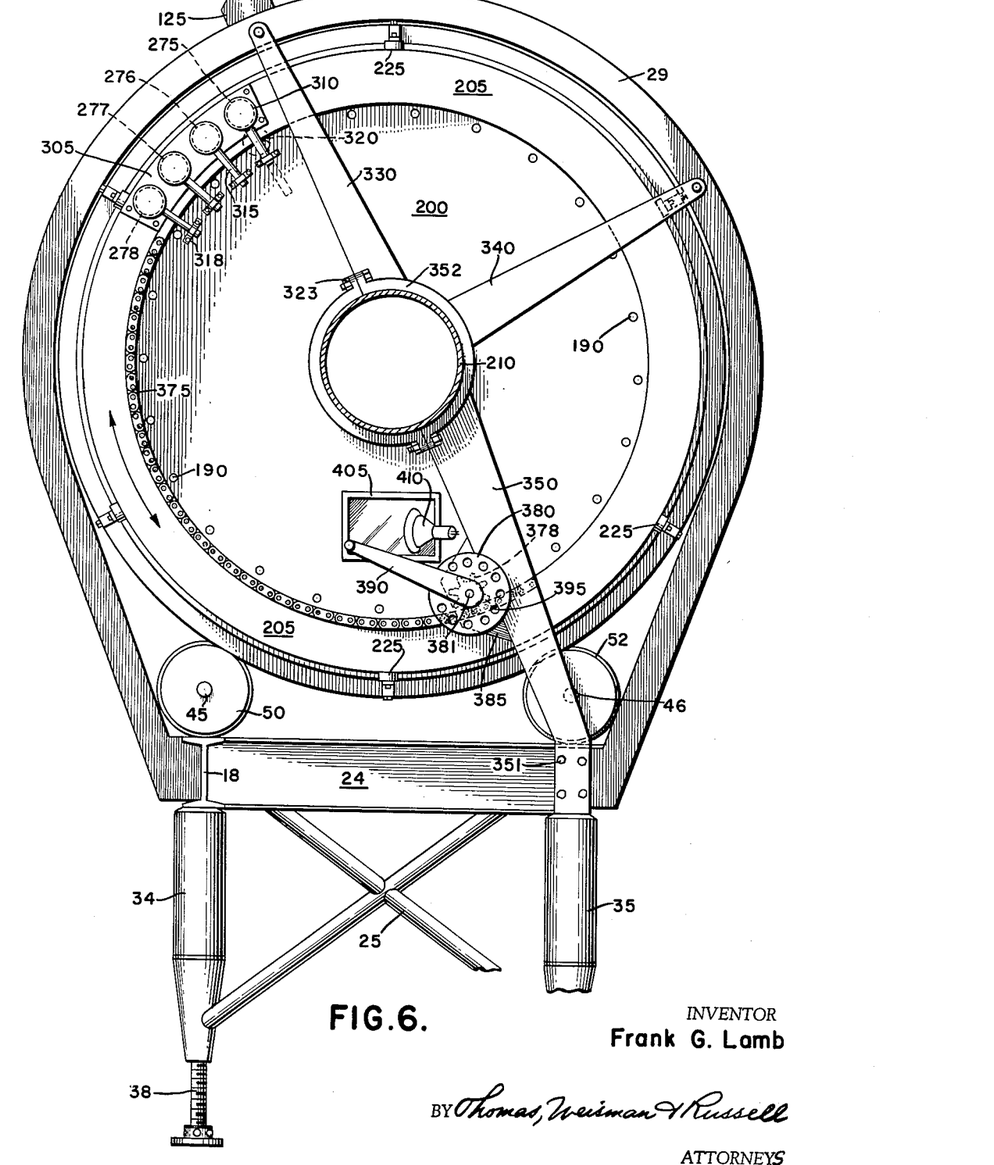
FIGURE 6 is an end elevation view, similar to the view of FIGURE 4, but of the opposite or discharge end of the dehydrator and particularly illustrating the mechanism utilized to vary the optional positions of the discharge openings.
Figure 9:
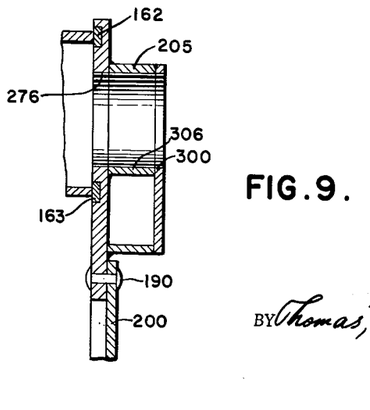
FIGURE 9 is an enlarged section view of one of the discharge openings for the dehydrated and completely processed product.

At the discharge end of the dehydrator, and in order that rate of discharge may be further controlled, several discharge openings are provided. These can be optionally positioned and controlled by the operator to selectively locate such openings at a high or low point, and thus alter the rate of discharge. Referring particularly to FIGURES 6 and 9, it is seen that a series of such openings 275, 276, 277 and 278 are made in the circular wall 159 which wall has heretofore been described with reference to the sealing means which it supports. Each of the referred to openings are located within a 30 degree angle, viewing FIGURE 6, the lowermost of such openings in the relative position as shown, being at about 300 degrees to the vertical and the uppermost of same being at about 330 degrees. All of such discharge openings are positioned to intercept the annular chamber 13 as will be understood by reference to FIGURE 6.

Corresponding openings such as the opening 300, shown in FIGURE 7, are formed in the channel member 205, and such corresponding openings matching similar apertures in a plate 305 that is affixed to the outer face of the annular channel 205, as particularly illustrated in FIGURE 9. A tubular element 306 may connect, e.g., opening 276 with apertures 300. These discharge openings, here illustrated as four in number, thus extend from the outside of the unit directly into the annular chamber 13 to which the product has been admitted.

One or more of such discharge openings can be utilized, at the option of the operator, in the operation of the dehydrator. This is accomplished by a series of circular covers 310, adapted to cover each one of such openings (again refer to FIGURE 6) and these covers each have an extension 315 which is adapted to be held in position, in slidable relationship, by a clamping means or hasp 318, holding same in slidable relationship and suitably screwed to the end plate 200. Hence, each cover may be moved toward the center axis, and by such movement, the respective passageway is opened for discharge of the product. In FIGURE 6, all covers 310 are shown in place; however, the position of one of these is indicated in dotted line at 320 in withdrawn position, whereby the discharge passageway 275 would be open for discharge of the product.

A further control is utilized over the rate of discharge of the dehydrated product. This is found in a rack and pinion arrangement which permits the operator to position the four discharge openings at the high point indicated in FIGURE 6, or lower such discharge openings to a position near the bottom of the unit; at this latter position, it is obvious that rate of discharge, so far as these openings be concerned, would be at its maximum.

It will be recalled that the collar 205 is suitably welded to the circular plate 159 and designed to move in unison therewith, also carrying with it the end cover plate 200. Hence, the sealing means at the discharge end of the unit, although stationary with respect to rotational movement of the double drums, is adapted to be independently rotated for alternate positioning of the four discharge openings, described above. To achieve this three supports are provided. Two of these, 330 and 340, angularly disposed with respect to each other, are secured to the end frame member 29; the third, support 350 is welded or bolted, as by bolts 351, to the bottom of the main frame as shown in FIGURE 6. These brackets provide the main support for the inlet tube 210, the latter furnishing the classifying air supply. Such brackets also provide support for the pinion driving the rack arrangement which permits alteration of the position of the four discharge openings.

In any event, the brackets 330, 340 and 350 are welded or otherwise securely affixed to a collar 352 that surrounds the pipe 210, and take up adjustment screws 323 arranged upon this split collar permit the latter to be maintained in tight relationship with such inlet tube; when the position of the supplementary air inlet is to be altered in a manner to be later described, this clamp arrangement 352 can thus be slacked off to alternatively permit rotation of the radial inlet tube to the desired extent.

At any rate, radial adjustment of the collar 205, and hence radial positioning of the several discharge openings in association therewith and for purposes of increasing or decreasing flow of product from the dehydrator, is directly accomplished by the referred to rack-pinion arrangement. In this instance the rack takes the form of a link chain drive 375 secured to the inner diameter of the collar 205 and extending approximately 160 degrees around the circumference thereof. The engaging pinion is found in pinion 378, the latter being affixed to a pinion plate 380 for suitable rotation therewith upon an axis or shaft 381. This shaft 381 is supported by a lateral extension 385, the latter being made integral with or secured to the bracket 350. A handle 390, attached to the pinion, enables rotation thereof by the operator in either direction. The pinion 378 is obviously positioned for geared engagement with the rack 375.

In the position shown in FIGURE 6, the four openings 275 to 278 inclusive are located to about their highest extent. However, upon rotation in a counterclockwise direction of the pinion 378 (viewing FIGURE 6), the rack 375 and consequently the collar 205, together with these several discharge openings, will be carried downwardly to any desired extent.

Once adjustment is made, such adjustment is maintained by insertion of an appropriate locking pin through one of the openings 395 and through an appropriate additional aperture bored in the frame member 350.

A suitable chute 400 is employed for ultimate discharge of the dehydrated product. This is secured in any usual fashion to one or more of the referred discharge openings, and fitted with flexible connections to permit attachment thereto irrespective of the radial positioning of such openings in the manner described above.

Additional visual observation of the progress of the material through the dehydrator is enabled by provision of a suitable window 405. As light is desirable for this purpose, the illuminating source 410 is disposed as indicated in FIGURE 6, in the end plate 200.

*Classifying Air Supply*

Reference to the admission and direction of flow of the main dehydrating medium through the line 8 has been made in the foregoing. Such medium, usually dry or dehumidified air at elevated temperature, achieves desired reduction of water content of the product being processed.

The classifying, or supplemental air supply, although similarly contributing to this primary function of dehydration, has this additional and main function—that of sorting or separating from the main charge those portions or particles of the product which, during the operation, have reached that stage of optimum water removal. Such particles are thrown through the area A, as depicted in FIGURE 5, by rotation of the twin drum unit. During such transfer from side to side within the annular space 13, those particles traversing the same which have lost the required amount of moisture, and hence are lighter, become air-borne due to the admission at that point of supplementary or classifying air. As explained above, with the only outlet available for such air to the rear of the unit, this classifying air takes a rearward path carrying these air-borne particles with the air stream. The function is thus largely that of "fluidizing" the bed of material which is caused to flow across the area A during rotation of the concentric drums.

This classifying air supply emanates from the blower 10 where, through a suitable pipe 420 and appropriate connection 425, it is fed directly into the tube or pipe 210. The classifying air carrier conduit 210 is disposed along the axial length of the unit as shown in FIGURE 7 and terminates in a conical formation 500 for it faces the flow of incoming dehydration medium. Conduit 210 is supported at this end by a wall 501 which forms the forward wall of the classifier air throat, to be described. The rear wall 502 of such air throat is also seen in FIGURE 7.

The supplemental air supply is directed from the conduit 210 through an elongated and narrow passageway 510 forming a classifying air throat and likewise extending throughout the substantial length of the unit. Such is formed by opposed plates 502 and 504, this air chute being directed into the lower side of area A as shown in FIGURE 5. The two sides of the passage are secured to respective flange formations 505 formed in the conduit 210 and forming a slot opening into said conduit. A bolt connection 506 secures the sides 502 and 504 to the conduit flanges 505.

To assure more positive flow into the air classifier throat of air entering the conduit 210, a series of baffle members 508 (FIGURES 5 and 7) are located to extend downwardly toward, and almost to, the center axis of the conduit 210. These baffle members, shown in cross section in FIGURE 7, are elongated flat pieces slightly curved towards the direction of flow. They are secured between the two side flanges 505 of the conduit by means of the same bolts 506 which rigidly support the walls of the air throat 510. Such baffles 508 can be readily adjusted, i.e., angled more towards the source of supply of air than that shown in FIGURE 7, in which case their effectiveness as pick ups for incoming air can be correspondingly varied. These baffles or air scoops are evenly spaced throughout that length of the conduit within the double drum area, and approximately one third of the length of same extends into the air channel 510.

Mention has been made in the foregoing of a means to block off the main air supply from what would be the path of least resistance—that area A where fluidizing, or air-borne conveyance of the product particles takes place. To this end the respective sides of the air throat 510 terminate in two flanges 512 and 515 which are curved or arced to form a circumference concentric with the inner circumference of inner screen, as shown in FIGURE 5.

The amount of surface area protected from or acting as a shield against the main dehydrating medium may be increased or decreased, or that shielding area rendered variable, by two side pieces which interfit with the flanges 512 and 515 at distances within the option of the operator. Such additional pieces take the form of flanges or shields 520 and 522, also having the form of an arc or partial circumference of a size to rather precisely and slidably interfit with the respective and stationary flanges 512 and 515.

Variable end flanges 520 and 522 are rendered adjustable by the use of two series of appropriate turnbuckles 530 and 532, each of such turnbuckles being pivoted at opposite ends with suitable lugs 533. Such lugs are connected to opposite ends of the turnbuckles and provided with a pivot fixtures 535 which will permit adjustment of the turnbuckles and also permit fixing of the same in predetermined position. In the example of the invention herein described each side of this variable mechanism is provided with seven of such turnbuckles, totalling fourteen, in each instance such construction, as stated, forming support for the respective variable flanges 520 and 522.

It will now be appreciated that these several shields can be adjusted so as to cover different sizes of the area A. For example, and viewing FIGURE 5, the flange 520 is indicated as being nearly to its outermost extension; however, by loosening the pivot points of the intermediate turnbuckle, such flange 520 can be moved inwardly to the partially closed position indicated by the dotted line 540, with the corresponding movement and corresponding adjustment of the there involved turnbuckle, also indicated in dotted line. Conversely, the opposed variable cover 522 can likewise be adjusted and again viewing this figure, it is seen that with a like adjustment of that series of turnbuckles, this curved piece can be moved into a fully retractable position shown by the dotted line 541, with a corresponding upward and angular adjustment of the corresponding turnbuckle. In both cases the involved series of turnbuckles permits extension or retraction of this supporting means to the desired extent and the pivot points at each end of each turnbuckle likewise permit adjustment of the arc made by the end pieces so that despite inward or outward movement such plates 520 and 522 will circumscribe a circumference concentric, and contacting with, the circumference of the permanent shields 512 and 515.

Such an adjustment permitted by this mechanism offers a variable amount of shielding area, such variable accommodating different types of products and alternate conditions of processing. The flow arrows of FIGURE 5 indicate the manner by which primary, dehydrating medium is prohibited from entering area A: direction thereof is reversed by impingement upon the curved shields just described.

In addition to this mechanism for adjusting the amount of shielding effect underneath the area A, a further means is utilized to vary, at the desire of the operator, the radial direction of flow of the classifying air through the air throat 510 of that mechanism. Such means comprises a curved plate 560, the periphery thereof coinciding with the arc formed by the shields 512 and 515. This plate is welded or otherwise suitably secured to tubular element 170 and disposed right angularly thereto, so that the face of the plate 560 is parallel to the face of the end cover 501 of the air classifier throat. The latter is provided with a suitable flange which is perforated in such manner as to accommodate bolts 563 on each side of the air throat. The plate 560 likewise contains apertures 562 for reception, in locked relationship, of the two bolts 563.

As indicated in FIGURE 4 and with reference to the vertical, the air throat is disposed at an angle of about 42 degrees. With the size of plate 560 here shown it will now be readily apparent that the air classifier throat 510 can be moved about 10 degrees to the left so that it occupies a position of about 32 degrees to the vertical; whereas and again with respect to the same size plate 560, such air throat can be moved angularly and downwardly an equivalent 10 degrees or to an angle to the vertical of about 52 degrees. It is obvious also that the plate 560 can be larger in size so that these angular movements within this single quadrant can be increased. When so positioned to either side of the position shown the end wall 501, through the flange referred to, is bolted by means of bolts 563 in locked position.

Any such movement of the air classifier throat results in corresponding movement of the permanent and adjustable shield elements. It will be noted that the opposite end of the conduit 210 is rigidly supported by the collar 352. If the air classifier throat is to be adjusted with respect to its angular inclination in the manner just described, then the clamping bolts 323 which maintain the collar 352 in tight relationship with the conduit at the opposite end of the unit must necessarily be loosened in order that conduit 210 can be rotated the desired amount in the desired direction, with subsequent tightening of such collar 352 after the adjustment has been made.

*Mode of Operation*

If operation commences with appropriate and predetermined settings of certain variables such as rate of flow of the dehydrating medium, temperature thereof, and rate and flow of the classifying air supply, all these prior to admission of the product to the annular area between screens, then at the commencement of such operation it is desirable to temporarily cover that portion of the dehydrator which is not covered by the hood 120. Such temporary covering can take the form of fabric pieces snapped into place around the exterior of the unit, excepting that portion surmounted by the hood 120.

This is desirable, for upon initial admission of the product to the dehydrator, when the latter is rotating and with the two mediums being concurrently admitted, particles of the product would be blown about, discharged more rapidly than desired and improperly processed. In any event, after the charge of material has approached that amount which would fill the annular chamber to the extent indicated in FIGURE 5, then normal operation proceeds with removal of the temporary coverings, but with hood 120 lowered in place.

Considering the processing of peas as an example, it has been found that the preferred temperature of the dehydrating medium entering the interior of the unit through the discharge conduit 8 should be in the neighborhood of 170 to 180° F., with the preferred temperature being about 175° F.

Product flow is regulated mechanically by automatic mechanism associated with the feed-in hopper, by angle of tilt of the dehydrator from inlet to outlet, and by positioning of the discharge openings at the desired point. These variables, once understanding the nature of the invention and the desiderata to be attained, can be adjusted by those skilled in the art to obtain the proper degree of uniform dehydration.

The process is continuous, with the main dehydration medium entering at a controlled rate into the inner area defined by the inner reel, and flowing outwardly through the inner screen, the annular chamber containing the product, and the outer screen into the room. With a material bed thickness of about 6 inches and a speed of rotation of the double drum unit of about 3 r.p.m., and at operating temperatures of dehydrating medium of about 175° F., peas can be processed and suitably dehydrated to the desired degree of moisture removal (about 60% dehydration) at a rate of about 3,000 pounds per hour.

Continuous rotation of the annular chamber thoroughly mixes the particles of product therein, assuring that all such particles will uniformly come into contact with the hot, dehydrating medium, the T-bars 66 acting as product lifters and forcing the particles to gradually be lifted from one side of the unit to the other. Such product lifters as represented by these elements prohibit any tendency of the particles to slide between the two reels, and thus substantially reduce any abrasive activity which would normally result.

The main dehydrating medium is forced through the bed of product, as this is its only exit. Area A is shielded by the shields adjacent the classifier air throat, and the Teflon end seals preclude egress through and longitudinally of the circular chamber 13. Hence, the cause of such air is restricted to lateral or radial movement through the bed of product between the rotating screws and out into the room.

During rotation the product falls by gravity from one to the other side of the area A. It is here intercepted by the supplementary or classifier air supply. At this point, and particularly as the product gradually flows through the unit, certain particles will progressively become dehydrated to the desired extent, whereas others, more generally those of larger size, will have insufficient moisture removed. Such others remain nearer the inner screen surface, and do not become air-borne until reaching the required state of dehydration. At any rate, those particles which gradually become sufficiently dehydrated, at that point of tumbling in area A, and being subjected to an air blast from the classifier air throat 510, become air-borne. The only exit for the classifying air supply is toward the discharge openings, for the upper portion of the outer screen is blocked by the hood 120 and the remaining portions of same are filled with the product, which blocks egress through these latter portions. Also the end seals prevent egress longitudinally out of the annular chamber 13. Hence, the classifying air supply will be driven rearwardly and such air-borne products carried thereby to the discharge openings.

As stated, those heavier particles which are forced by rotation through the area A and do not become air-borne, are again cycled adjacent or near to the inner screen. They are thus again subjected to the full force and dehydrating effect of the main hot dehydrating air. This continues until the water content of such particles has been so reduced that they also become light enough to be air-borne, resulting in ultimate discharge. Thus a continuous and effective process is provided wherein by use of two mediums arranged to penetrate the bed of material in the manner described herein, dehydration is uniformly attained, so that all particles of the charge which reach the discharge outlet exhibit the same percentage of water retention. Use of the classifying air supply eliminates the possibility that when the apparatus has been set for dehydration to say, 50% water removal, certain of the particles when discharged contain in fact more than 70% of water and others are so completely dried as to prohibit ultimate reconstitution.

Also, although the processing of peas has particularly been referred to herein, this is exemplary only, for almost any type of fruit or vegetable can be so treated with the instant apparatus. It is for this reason that same is subject to substantial changes in mode of operation. Thus, the shields which protect the main air supply from being dissipated through the area A may be adjusted in peripheral extent depending upon the type of product being treated. Also, the direction of the classifier air vent 510 can be altered to suit the problems encountered during processing of different types of material. In addition the relative force at the classifier throat is subject to control by the series of scoops or baffles 508. Further, temperature, pressure and rate of flow of the gaseous mediums are subject to change to accommodate the particular type of product being dehydrated.

Practice of the process herein disclosed and use of the particular apparatus herein described results in profound advantages over previous systems aimed at the partial dehydration of food products of the type herein contemplated. For example, applying air pressure to the center of the unit, or from inside out, results in less "compacting" of the material since the highest air pressure is then applied where the circumference is less, and as the air pressure is reduced by resistance from the product, the area for the hot air to escape will be increased as it gets nearer the outside, where the circumference of the involved circle is considerably greater. As a further advantageous factor, applying the air to the inside of the rotating double drum unit eliminates the necessity of a housing completely around the dehydrator, for such air, although nearly saturated, can be discharged into the plant room without ill effect. Furthermore, with only a partial hood instead of a surrounding housing, the progress of dehydration can be checked upon and viewed with relative ease during operation of the system.

The cleaning effect of application of air pressure to the interior of the inner reel has been mentioned: such directional flow tends to maintain the inner screen clean of particles of the material being dried, while the outside screen will have little tendency to be plugged with these particles since there is more screen surface. This cleaning function is particularly implemented by the "jet" effect of supplementary air from the classifier air throat 510, especially since the latter enters the annular chamber 13 at that portion largely absent of the food product. As the outside screen is unhoused, it can be cleaned from the outside with air or steam at high pressure during operation of the unit at that portion of the outside screen not in contact with the product, e.g., area A, where the product is being tumbled and mixed.

In the practice of the invention and again with respect to a specific product, fresh peas, it has been found that the pulp temperature of same, with a feed-in temperature of dehydrating medium of about 175° F., can be maintained at 80° F. with this system—a sufficiently low temperature to preclude pulp damage but which will effectuate continuous and thorough dehydration to the point desired without deleteriously affecting the pulp fibers of the vegetable.

In the foregoing I have disclosed a novel method and apparatus, economical in practice and in construction, and conducive to rapid and efficient dehydration of bulk materials. Of greater significance, the invention involves a new concept of continuous dehydration which presents a practical solution to those difficulties heretofore present in the industry and generally referred to in the foregoing. Although it is obvious that this invention may be varied in many ways and other expedients or alternates employed to accomplish the purposes hereof, it is to be understood that my invention is to be limited only by the scope of the appended claims.

I claim:

1. In a dehydrator for food materials, an annular rotatable chamber having inner and outer perforate walls and means for rotation thereof, means to admit said materials to and discharge said materials from said chamber, said discharge means being positioned near the upper end of said chamber, means to pass a dehydrating medium through said chamber from the inner to outer walls thereof, means to pass classifying air radially into the upper portion of said chamber and longitudinally along the length thereof and to direct the same to said discharge opening, said discharge opening being in the path of said radially discharged classifying air, whereby the partially dehydrated of said materials become air-borne by said air and are discharged through said discharge means.

2. The combination as defined in claim 1 wherein said classifying air is passed longitudinally into the area surrounded by said inner wall and said medium is passed into said area in a direction opposite thereto.

3. The combination as defined in claim 1 wherein a shield is provided adjacent said upper portion and the inner side of said inner wall to prevent the flow of medium therethrough and means are provided to permit said classifying air to enter said upper portion intermediate the ends of said chamber.

4. The combination of claim 3 wherein said shield is adjustable circumferentially with respect to said inner wall and said means to pass classifying air is provided with means to vary the radial direction of flow of said air into said upper portion.

5. In a rotary dehydrator mechanism for food materials the combination comprising concentric, rotatable inner and outer perforate screens having an annular material receiving space therebetween, the radial distance between said screens being less than the radial distance from the axis of rotation to said inner screen, said screens being mounted for simultaneous rotation with respect to a common axis, said space being sealed at each end thereof, conduit means to admit a dehydrating medium at one end into the interior of the inner of said screens whereby said medium is forced through said space and said material, means to direct a classifying medium radially outward to discharge into said space in the upper region of said space, whereby said material becomes air-borne thereby, and means disposed adjacent said upper region of said space to discharge dehydrated material from said space, said discharge means being in the path of said radially directed classifying medium.

6. In a rotary dehydrator mechanism for food material the combination comprising concentric, rotatable and perforate reels having an annular material receiving space therebetween, said reels being mounted for rotation with respect to a common axis, a sealing means for each end of said annular space to prevent air flow out of said ends, means to admit a dehydrating medium at one end into the interior of the inner of said reels whereby said medium is forced through said space and said material, means including a classifying air throat to admit a classifying medium into said interior, said air throat being radially disposed to discharge into said space and extending longitudinally thereof, whereby said material becomes air-borne by said classifying medium, and means in the path of said radially discharged classifying medium to discharge dehydrated material from the upper portion of said space.

7. In a rotary dehydrator mechanism for food materials the combination comprising concentric, rotatable and perforate reels forming an annular material receiving space therebetween, said reels being mounted for rotation with respect to a common axis, said annular space being sealed at each end thereof, opposed air conduits positioned within the area circumscribed by the inner of said reels, one of said conduits being provided with a radial passageway opening into said annular space and having means to discharge a classifying medium thereto, the other conduit admitting a dehydrating medium to said circumscribed area, means to rotate said reels, means at one end of said material receiving space to admit said materials there to discharge means positioned at the opposite end of said annular space and in the path of said radially discharged classifying medium, whereby said materials become dehydrated by said dehydrating medium and are discharged from said dehydrator at the upper region of said material receiving space, and in air-borne fashion, by said classifying medium.

8. In a dehydrator having rotatable, concentric and perforate drums forming an annular chamber therebetween for the reception of food materials to be dehydrated, the combination of means to admit materials to said chamber at one end thereof, means to discharge materials from the other end of said chamber, said discharge means being positioned adjacent the upper region of said chamber, means to admit a dehydrating medium along the axis of rotation of said drums, means to admit a classifying medium along said axis, said last named means having a closed passageway radially directed to an upper portion of said chamber to fluidize the material in said upper portion, said discharge means being in the path of said classifying medium, the ends of said chamber having seals to prevent discharge of said mediums therethrough, a shield under said upper portion to prevent said dehydrating medium from entering said upper portion, whereby said dehydrating medium contacts said materials during rotation of said drums and said classifying medium causes the sufficiently dehydrated of said materials in said upper portion to become air-borne and directs them to said discharge opening.

9. In a rotary dehydrator for food materials having concentric, rotatable and perforate screens, said screens forming an annular product chamber therebetween, means at one end of said chamber to admit said materials, means at the other end of said chamber to discharge materials therefrom, said discharge means being positioned near the upper region of said chamber, means to admit air at elevated temperature longitudinally into the area defined by the inner of said screens for passage through said chamber, means to discharge classifying air radially into said chamber and along the length thereof, said last named means comprising an air conduit positioned within said area, said conduit having a radially positioned air throat interconnected with the upper portion of said product chamber to admit classifying air thereto, each side of said air throat having shields to prevent said dry air from venting into said upper portion, said discharge means being in the path of said radially discharged classifying air, whereby said materials passing through said upper portion during rotation of said screens become air-borne when sufficiently dehydrated and are carried to said discharge means by said classifying air.

10. The combination as defined in claim 9 wherein said shields are adjustable to selectively provide coverage of greater and lesser areas over said annular chamber.

11. The combination as defined in claim 9 wherein said air throat is selectively adjustable radially to permit alteration of the direction of flow of said classifying air.

12. In a dehydrator for food materials, a rotatable chamber having inner and outer concentric, perforate walls forming an annular product chamber, means to rotate said walls, the radial distance between said walls being less than the radial distance from the axis of rotation thereof to said inner wall, means to admit said materials to and discharge said materials from said product chamber, means to radially pass dehydrating, dry air through said chamber from said inner to said outer walls, and means to admit classifying air radially into the upper portion of said chamber for passage rearwardly therethrough to said discharge means, said discharge means being in the path of said radially admitted classifying air.

13. In a dehydrator for food materials, a rotatable chamber having inner and outer concentric, perforate walls forming an annular product chamber, means to rotate said walls, the radial distance between said walls being less than the radial distance from the axis of rotation thereof to said inner wall, means to admit said materials to and discharge said materials from said product chamber, means to radially pass dehydrating, dry air through said chamber from said inner to said outer walls, means to admit classifying air radially into the upper portion of said chamber for passage rearwardly therethrough to said discharge means, sealing means at each end of said annular product chamber to prevent discharge of said dry air and said classifying air therethrough, said discharge means comprising an opening in the sealing means at the discharge end of said dehydrator, said opening being in communication with said annular product chamber, said discharge end sealing means having an end plate and means for independent rotation thereof, whereby said opening can be selectively positioned circumferentially with respect to said annular chamber to vary the rate of discharge of materials therethrough.

14. The combination as defined in claim 13 wherein said means for independent rotation of said end plate comprises a rack means circumferentially mounted with respect thereto, a pinion means in engagement with said rack means, and means for rotation of said pinion means.

15. A process for the dehydration of food products comprising continuously admitting particles of said products to an annular, rotating zone in an amount to fill all but the upper portion of said zone, contacting said products with a dehydrating medium admitted to the center of said zone for passage through said zone, fluidizing the rotating products near said upper portion by admission of a further dehydrating and classifying medium directed radially into said upper portion of said zone during rotation thereof whereby a portion of said particles becomes air-borne and are forced toward a discharge point by said classifying medium, said discharge point being in the path of flow of said classifying medium and discharging the dehydrated portion of said products at said discharge point.

16. A process for the dehydration of discrete particles of food products comprising admitting said particles to an annular, rotating zone to fill all but the upper portion of said zone, the walls of said zone being perforate to permit passage of a gaseous medium laterally therethrough, contacting said particles with a gaseous dehydrating medium at elevated temperature through said zone by admission of said medium through the center axis of the zone at one end thereof, fluidizing the products near said upper portion of the zone by admitting a classifying medium into said zone along the longitudinal axis thereof and directing said classifying medium radially into said upper portion during rotation of the zone, whereby particles in said upper portion which are substantially dehydrated become air-borne, and discharging dehydrated particles from the opposite end of said zone at a point in the flow path of said classifying medium.

References Cited in the file of this patent
UNITED STATES PATENTS

| | | |
|---|---|---|
| 231,384 | Wiesebrock | Aug. 17, 1880 |
| 1,051,196 | Chodounsky | Jan. 21, 1913 |
| 1,521,773 | Johnson | Jan. 6, 1925 |
| 2,139,445 | Dinwiddie | Dec. 6, 1938 |
| 2,152,167 | Ahlmann | Mar. 28, 1939 |
| 2,346,500 | Moore | Apr. 11, 1944 |